United States Patent [19]

Marino et al.

[11] Patent Number: 5,189,907
[45] Date of Patent: Mar. 2, 1993

[54] INTERNAL COMBUSTION ENGINE MAPPING APPARATUS AND METHOD

[75] Inventors: Joseph A. Marino, Waukesha; Surender Makhija; John P. Sutton, both of Brookfield; Steve A. Trottier, Oconomowoc, all of Wis.

[73] Assignee: Bear Automotive Service Equipment Company, New Berlin, Wis.

[21] Appl. No.: 661,662

[22] Filed: Feb. 27, 1991

[51] Int. Cl.$^5$ ............................................ G01M 15/00
[52] U.S. Cl. ...................................................... 73/116
[58] Field of Search .................... 73/116, 117.2, 117.3; 364/431.03, 431.07, 431.12

[56] References Cited

U.S. PATENT DOCUMENTS

| 4,502,324 | 3/1985 | Marino et al. | 73/117.3 |
| 4,644,284 | 2/1987 | Friedline et al. | 364/431.12 |
| 5,095,742 | 3/1992 | James et al. | 73/116 |

FOREIGN PATENT DOCUMENTS

| 2243556 | 4/1973 | Fed. Rep. of Germany | 73/117.2 |
| 3705692 | 9/1988 | Fed. Rep. of Germany | 73/117.2 |

OTHER PUBLICATIONS

Gary Mueller, Sam D. Haddad, and Joe A. Marino; The Acceleration-Deceleration Test Technique for Conditioning of Spark-Ignition Engines; Sep. 12-14, 1988.

Primary Examiner—Robert Raevis
Attorney, Agent, or Firm—Kinney & Lange

[57] ABSTRACT

An RPM variation test for use in an engine analyzer system is used to test internal combustion engines. The engine analyzer individually disables cylinders and monitors instantaneous engine RPM, to generate an engine map. The engine analyzer performs an engine performance test upon the internal combustion engine. The engine map is used to map the results of the engine performance test. Using the present invention, an engine map is produced just prior to performing an engine performance test.

23 Claims, 7 Drawing Sheets

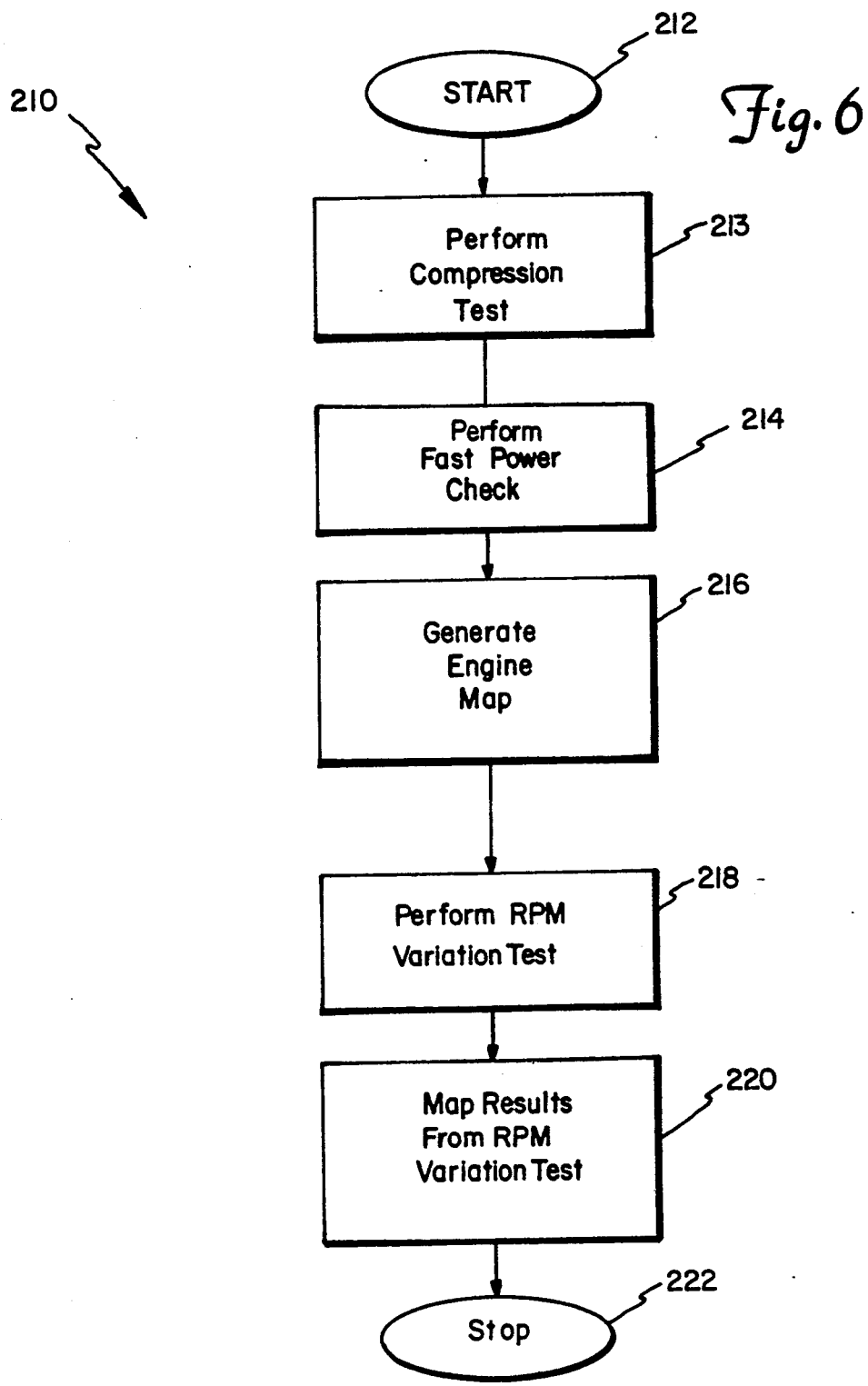

INTERNAL COMBUSTION ENGINE MAPPING APPARATUS AND METHOD

BACKGROUND OF THE INVENTION

The present invention relates to an engine analyzer apparatus used for testing internal combustion engines. In particular, the invention relates to a method and apparatus for performing cylinder misfire and power analysis of an internal combustion engine.

Engine analyzers are used to test the performance of internal combustion engines. In recent years, accuracy and reliability of engine analyzers have taken on greater importance as government engine emission restrictions have become increasingly strict. It has become increasingly important for an operator of an engine analyzer to both accurately and rapidly test the performance of internal combustion engines. In response, the automotive test industry has developed a number of tests.

A power check test is a test which indicates the relative power contribution between cylinders of an internal combustion engine. Prior to the advent of solid state ignition systems, power checks were simple but time consuming to perform. To perform a power check on an internal combustion engine using a distributor-type ignition system, a mechanic individually disconnects a spark plug wire from the distributor and watches the power drop in the engine output.

However, this prior art type of power check cannot be performed if the engine inputs and outputs are part of a closed loop engine control system, because the engine system compensates for the lost cylinder. In order to power check closed loop engine systems, a new test was developed. This test is called the fast power check. To perform a fast power check, the engine analyzer very briefly disables a cylinder while monitoring engine output. This does not give the closed loop system time to react and compensate for the lost cylinder.

A compression test is another type of engine test. A compression test is performed on an engine to indicate the compression of each cylinder. A non-invasive, relative compression test may be run by measuring voltage while cranking the engine with the starter motor. Large voltage drops in the electrical system indicate high compression, while small voltage drops indicate low compression in a cylinder. Large voltage fluctuations occur when the starter motor is heavily loaded. Thus, small voltage drops indicate poor compression. This is a non-invasive compression test which can be used to identify mechanical faults associated with each cylinder in an internal combustion engine.

Modern day internal combustion engines are often computerized and operate without a conventional distributor. This is known as a distributorless or direct ignition system. Distributorless ignition systems can be broken down into three broad classifications: DIS, direct, and DIS-direct.

A DIS-type ignition system uses one remotely-mounted ignition coil for each pair of cylinders. For example, a four-cylinder engine has two ignition coils, a six-cylinder engine has three ignition coils, and so on. In this system, one spark plug fires a positively going electric spark and the other, corresponding spark plug simultaneously fires a negatively going electric spark. Each spark plug fires once per revolution of the engine, first on a compression stroke and then on an exhaust stroke. The firing during the exhaust stroke is referred to as a waste firing. In the DIS-type ignition system, the electrical circuit through the two, spark plugs is as follows: electrical ground to a first spark plug, first spark plug to plug wire, plug wire to ignition coil, ignition coil to a second plug wire, second plug wire to a second spark plug, and second spark plug to electrical ground.

The integrated direct-type ignition system uses one directly mounted ignition coil for each cylinder. Therefore, a four-cylinder engine was four ignition coils, a six-cylinder engine has six ignition coils, and so on. In a direct-type ignition system, each spark plug typically fires a negatively going electric spark. Each ignition coil is attached to a spark plug and fires once for every two revolutions of the engine. In the direct-type ignition system, the spark plug is connected directly to the ignition coil through an adaptor.

A DIS-direct ignition system uses one directly mounted ignition coil for every two cylinders. Therefore, a four-cylinder engine has two ignition coils, and so on. In the DIS-direct ignition system, one spark plug fires a positively going electric spark and the other, corresponding spark plug simultaneously fires a negatively going electric spark. Each spark plug fires once per revolution of the engine, first on a compression stroke, and next on an exhaust stroke. The firing during the exhaust stroke is referred to as a waste firing. In the DIS-direct ignition system, each spark plug of a spark plug pair is directly connected to opposite sides of the ignition coil for that spark plug pair.

The advent of distributorless ignition systems required the development of new engine analysis equipment to test engine performance. A non-intrusive test of relative power contribution between cylinders of a distributorless ignition system-type internal combustion engine was developed. One such test is called a cylinder performance test or RPM variation test.

In an RPM variation test, capacitive probes are hooked to each spark plug wire of the engine and an inductive probe is hooked to the "No. 1" spark plug wire as a positive reference. Additionally, software means are used in some cases to guarantee correct "No. 1" synchronization. Signals from these sensors are monitored over a number of revolutions of the engine. Data is collected and stored in a computer system in the engine analyzer. After collecting the data, the times between cylinder firings are converted to revolutions per minute of the engine. Using the collected data, RPM variations between adjacent cylinders are calculated over the entire data set. The analyzer examines these RPM variations and constructs a table which shows the frequency of RPM drops at various predetermined levels of engine load.

Using this data, both major and minor faults may be located. For example, RPM variation tests can locate totally dead cylinders, as well as simple misfires.

For the cylinder performance or RPM variation test to be useful, it is necessary to have a cylinder map of the engine being tested. A cylinder map is a table which describes the firing order and location of cylinders in the engine. Additionally, the cylinder map shows how engine output is altered by a misfire. For example, a misfire in one cylinder typically does not appear as a drop in engine output until the firing of a succeeding cylinder Each new engine or engine modification must be mapped by the manufacturer of the engine analyzer equipment the map is stored in the engine analyzer. Prior to performing an engine test, an operator indicates the types, model, and year of the engine under test. Following testing, the map is applied to the test data and used to indicate the condition of individual cylinders.

It would be a useful and significant contribution to the art to perform RPM variation tests on engines without the necessity of storing individual maps for every type of engine.

SUMMARY OF THE INVENTION

The present invention provides a method and apparatus for performing engine performance tests on unmapped internal combustion engines. The present invention is an engine analyzer which automatically maps an internal combustion engine and uses this map to perform an engine performance test.

The engine analyzer briefly disables each cylinder while monitoring the firing time of each cylinder. The firing time is monitored and stored by a computer in the engine analyzer. Cylinders are disabled by shorting the primary just as the spark is delivered. Using this information, the analyzer maps the cylinders in the engine under test.

In accordance with the present invention, the engine analyzer performs a performance test on the engine. Information from the performance test is collected and stored by the engine analyzer computer. Using the derived map, the data from the performance test is mapped onto the various cylinders of the engine. In addition, information gathered during a compression test may be used to verify the engine map by isolating compression related problems from ignition related problems.

BRIEF DESCRIPTION OF THE DRAWINGS

FIG. 6 is a block diagram of engine mapping and testing.

DETAILED DESCRIPTION OF THE PREFERRED EMBODIMENTS

Figure 1:
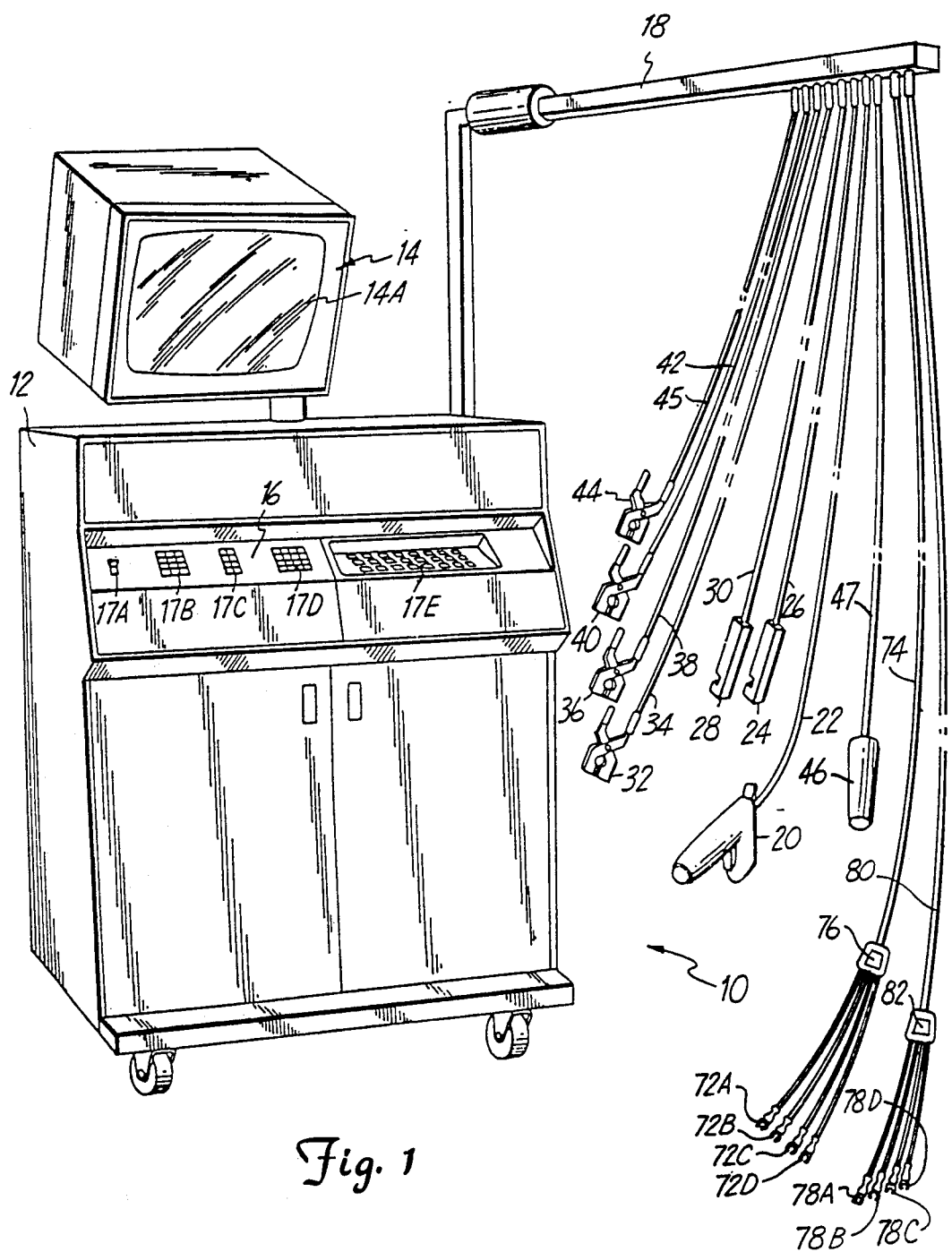
FIG. 1 is a perspective view showing engine analyzer apparatus which utilizes the present invention.

In FIG. 1, engine analyzer 10 is shown. Mounted at the front of housing 12 of analyzer 10 are cathode ray tube (CRT) raster scan display 14 and user interface 16, which is preferably a control panel having a power switch 17A, three groups of control switches or keys 17B–17D, as well as a keyboard 17E for entering numerical information. Extending from boom 18 are a plurality of cables which are electrically connected to the circuitry within housing 12, and which are intended for use during operation of the analyzer 10. Timing light 20 is connected at the end of multiconductor cable 22. "High tension" (HT) probe 24 is connected at the end of multiconductor cable 26, and is used for sensing secondary voltage of the ignition system of an internal combustion engine of a vehicle (not shown). "No. 1" probe 28 is connected to the end of multiconductor cable 30, and is used to sense the electrical signal being supplied to the No. 1 sparkplug of the ignition system. "Engine Ground" connector 32, which is preferably an alligator-type clamp, is connected at the end of cable 34, and is typically connected to the ground terminal of the battery of the ignition system. "Points" connector 36, which is preferably an alligator-type clamp, is attached to the end of cable 38 and is intended to be connected to one of the primary winding terminals of an ignition coil of the ignition system. "Coil" connector 40, which is preferably an alligator-type clamp attached to the end of cable 42, is intended to be connected to the other primary winding terminal of the ignition coil. Positive DIS probes 72A, 72B, 72C, and 72D are connected to the end of cable 74 through a junction box 76. Negative DIS probes 78A, 78B, 78C, and 78D are connected to one end of cable 80 through junction box 82. DIS probes 72A through 72D and 78A through 78D are capacitive pick-ups for coupling to spark plug wires of DIS engines. "Battery" connector 44, which is preferably an alligator-type clamp, is attached to the end of cable 45. Battery connector 44 is connected to the "hot" or "non-ground" terminal of the battery of the ignition system. Vacuum transducer 46 at the end of multiconductor cable 47 produces an electrical signal which is a linear function of vacuum or pressure, such as input manifold vacuum or pressure.

In the present invention, electrical signals derived from probes 24, 28, 72A through 72D, and 78A through 78D from connectors 32, 36, 40 and 44 and from vacuum transducer 46 are used to produce digitized waveforms which are stored as digital data in digital memory. Upon request by the user through user interface 16, analyzer 10 of the present invention displays on display 14 waveforms derived from selected stored digital data. Waveforms displayed by raster scan display 14 are simulated representations of individual digitized waveforms which have previously been stored.

Figure 2:
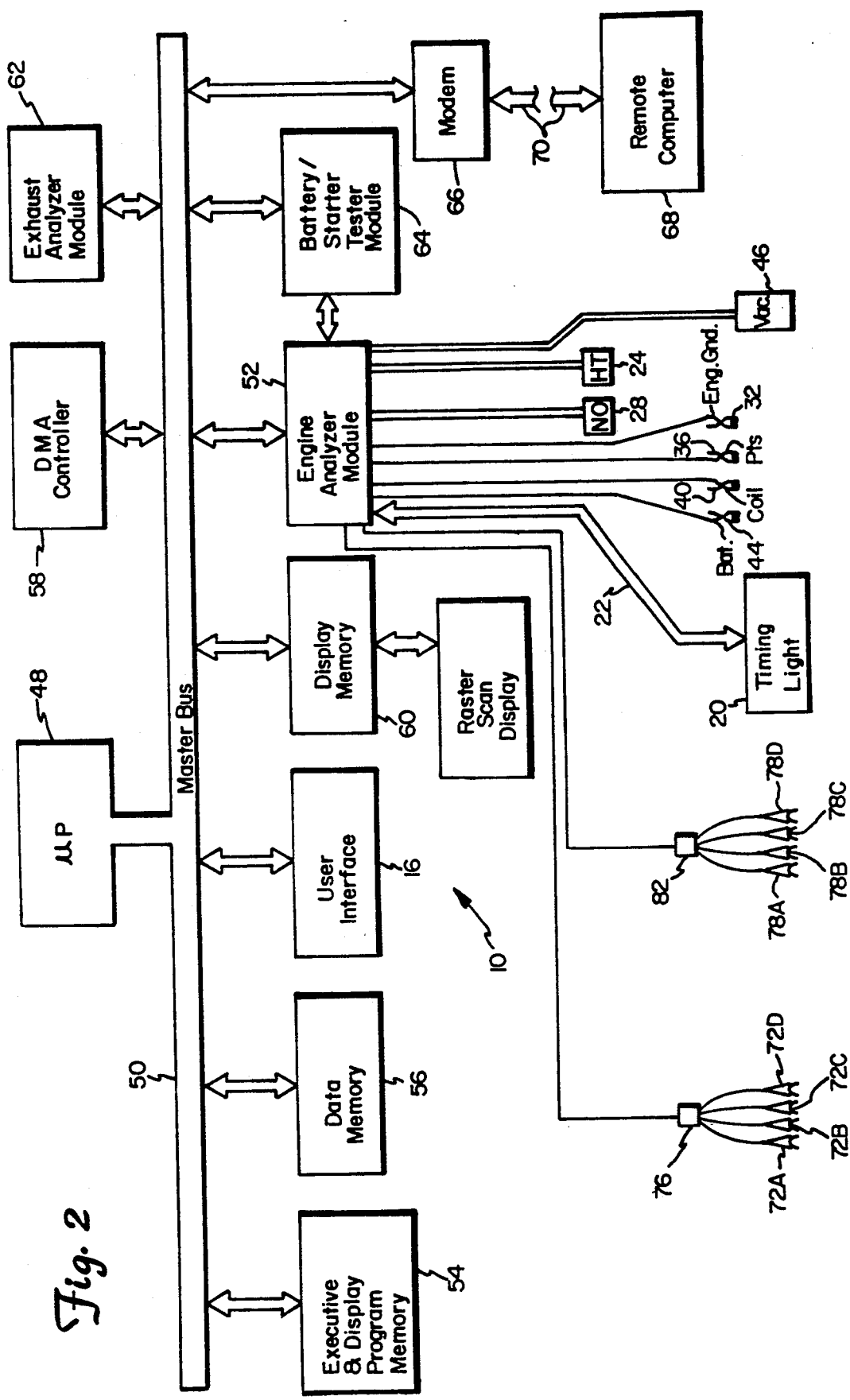
FIG. 2 is an electrical block diagram of the engine analyzer of FIG. 1.

FIG. 2 is an electrical block diagram showing engine analyzer 10 of the present invention. Operation of engine analyzer 10 is controlled by microprocessor 48, which communicates with the various subsystems of engine analyzer 10 by means of master bus 50. In the preferred embodiments of the present invention, master bus 50 is made up of a data bus, an address bus, a control bus, and a power bus.

Timing light 20, HT probe 24, No. 1 probe 28, Engine Ground connector 32, Points connector 36, Coil connector 40, Battery connector 44, DIS probes 72A through 72D and 78A through 78D, and vacuum transducer 46 interface with the electrical system of engine analyzer 10 through engine analyzer module 52. Engine analyzer module 52 includes a digital section and an analog section. Input signal processing is performed in the analog section, and the input analog waveforms are converted to digitized waveforms in the form of digital data. The digital section of engine analyzer module 52 interfaces with master bus 50.

Control of the engine analyzer system 10 by microprocessor 48 is based upon a stored program in engine analyzer module 52 and a stored program in executive and display program memory 54 (which interfaces with master bus 50). Digitized waveforms produced, for example, by engine analyzer module 52 are stored in data memory 56. The transfer of digitized waveforms from engine analyzer module 52 to data memory 56 is provided by direct memory access (DMA) controller 58. When engine analyzer module 52 provides a DMA Request signal on master bus 50, DMA controller 58 takes control of master bus 50 and transfers the digitized waveform data from engine analyzer module 52 directly to data memory 56. As soon as the data has been transferred, DMA controller 58 permits microprocessor 48 to again take control of master bus 50. As a result, the system of the present invention, as shown in FIG. 2, achieves storage of digitized waveforms in data memory 56 without requiring an inordinate amount of time of microprocessor 48 to accomplish the data transfer.

User interface 16 interfaces with master bus 50 and permits the operator to enter data and select particular tests or particular waveforms to be displayed. When the operator selects a particular waveform by means of user interface 16, microprocessor 48 retrieves the stored digitized waveform from data memory 56, converts the digitized waveform into the necessary digital display data to reproduce the waveform on raster scan display 14, and transfers that digital display data to display memory 60. As long as the digital display data is retained by display memory 60, raster scan display 14 continues to display the same waveform.

Display memory 60 contains one bit for each picture element (pixel) that can be displayed on raster scan display 14. Each bit corresponds to a dot on the screen of raster scan display 14. In preferred embodiments of the present invention, the digitized waveform stored in data memory 56 represents individually sampled points on the waveform. Executive and display program memory 54 includes a stored display program which permits microprocessor 48 to "connect the dots" represented by the individual sampled points of the digitized waveform, so that the waveform displayed by raster scan display 14 is a reconstructed simulated waveform which has the appearance of a continuous analog waveform, rather than simply a series of individual dots. Microprocessor 48 determines the coordinates of the dot representing one digitized sampled point on the digitized waveform, determines the coordinates of the next dot, and then fills in the space between the two dots with additional intermediate dots to give the appearance of a continuous waveform. The digital display data stored in display memory 60, therefore, includes bits corresponding to the individual sampled points on the waveform which had been stored by data memory 56, plus bits corresponding to the intermediate dots between these individual sampled points.

As further illustrated in FIG. 2, engine analyzer 10 has the capability of expansion to perform other engine test functions by adding other test modules. These modules can include, for example, exhaust analyzer module 62 and battery/starter tester module 64. Both modules 62 and 64 interface with the remaining system of analyzer 10 through master bus 50 and provide digital data or digitized waveforms based upon the particular tests performed by those modules. In the preferred embodiments shown in FIG. 2, modulator/demodulator (MODEM) 66 also interfaces with master bus 50, to permit analayzer 10 to interface with remote computer 68 through communication link 70. Modem 66 permits digitized waveforms stored in data memory 56 to be transferred to remote computer 68 for further analysis, and also allows remote computer 68 to provide test parameters and other control information to microprocessor 48 for use in testing.

Figure 3:
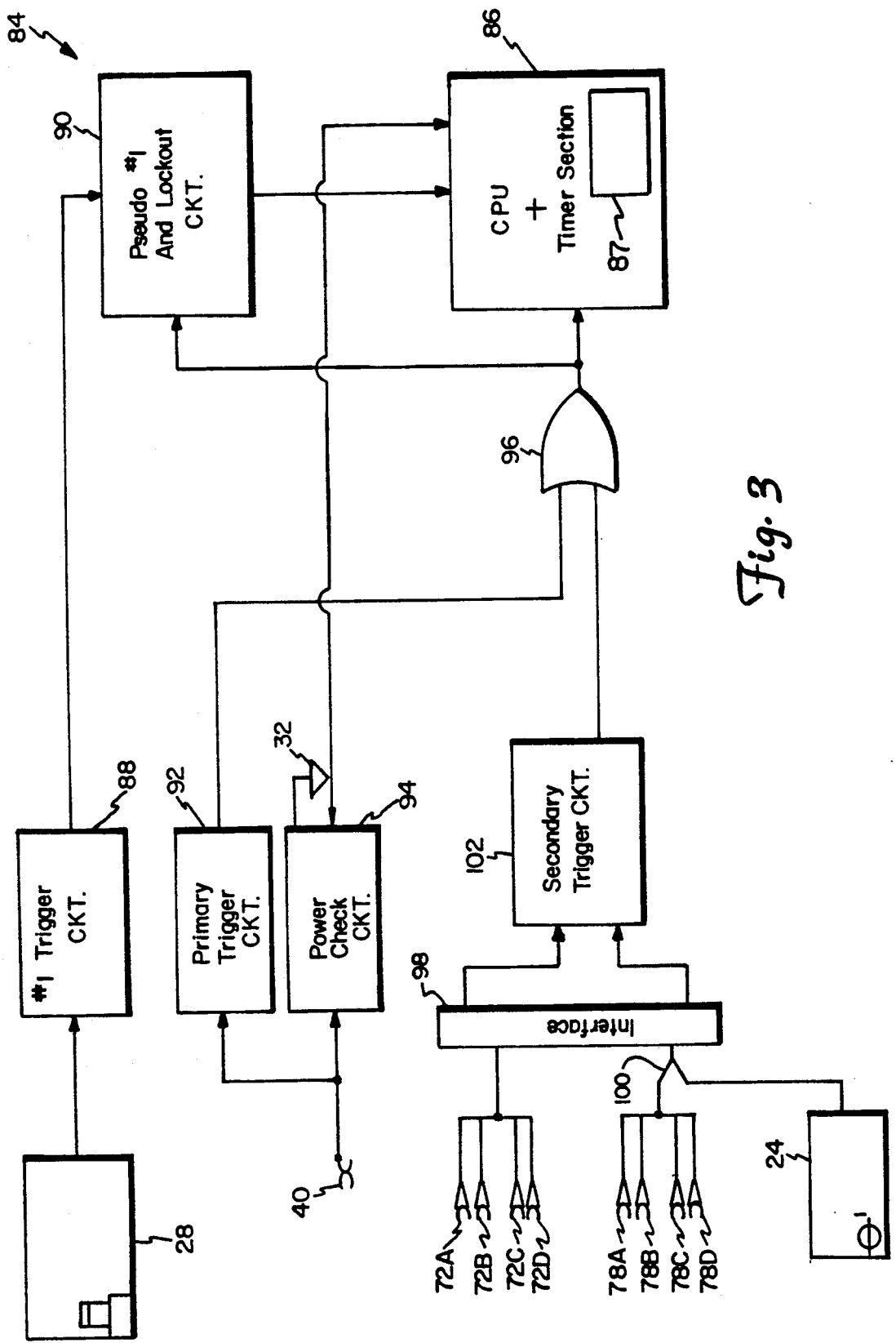
FIG. 3 is an electrical block diagram of a portion of the engine analyzer of FIG. 1.

FIG. 3 is a block diagram of engine analyzer circuitry 84. A central processing unit (CPU) and timer section 86 receives clock and timing inputs. CPU 86 includes memory 87. No. 1 probe 28 connects to No. 1 trigger circuit 88. No. 1 trigger circuit 88 provides an input to pseudo No. 1 and lockout circuit 90. Pseudo No. 1 and lockout circuit 90 provides an input to CPU and timer section 86. Coil connector 40 is connected to primary trigger circuit 92 and power check circuit 94. Power check circuit 94 is also connected to electrical ground. When power check circuit 94 receives a pulse from CPU 86, the primary of the engine ignition coil is electrically shorted to ground. This disables the firing of a spark. An input to power check circuit 94 is coupled to CPU and timer section 86. Primary trigger circuit 92 connects to an input of OR-gate 96. DIS probes 72A through 72D connect to interface 98. Negative DIS probes 78A through 78D also connect to interface 98. Secondary pick-up 24 connects to interface 98 through switch 100. Switch 100 switches interface 98 between negative DIS probes 78A through 78D and secondary pick-up 24. Interface 98 provides inputs to secondary trigger circuit 102. Secondary trigger circuit 102 provides a trigger to an input of OR gate 96. An output of OR gate 96 is connected to CPU and timer section 86 and pseudo No. 1 and lockout circuit 90. The output of OR gate 96 provides a cylinder clock.

Figure 4A:
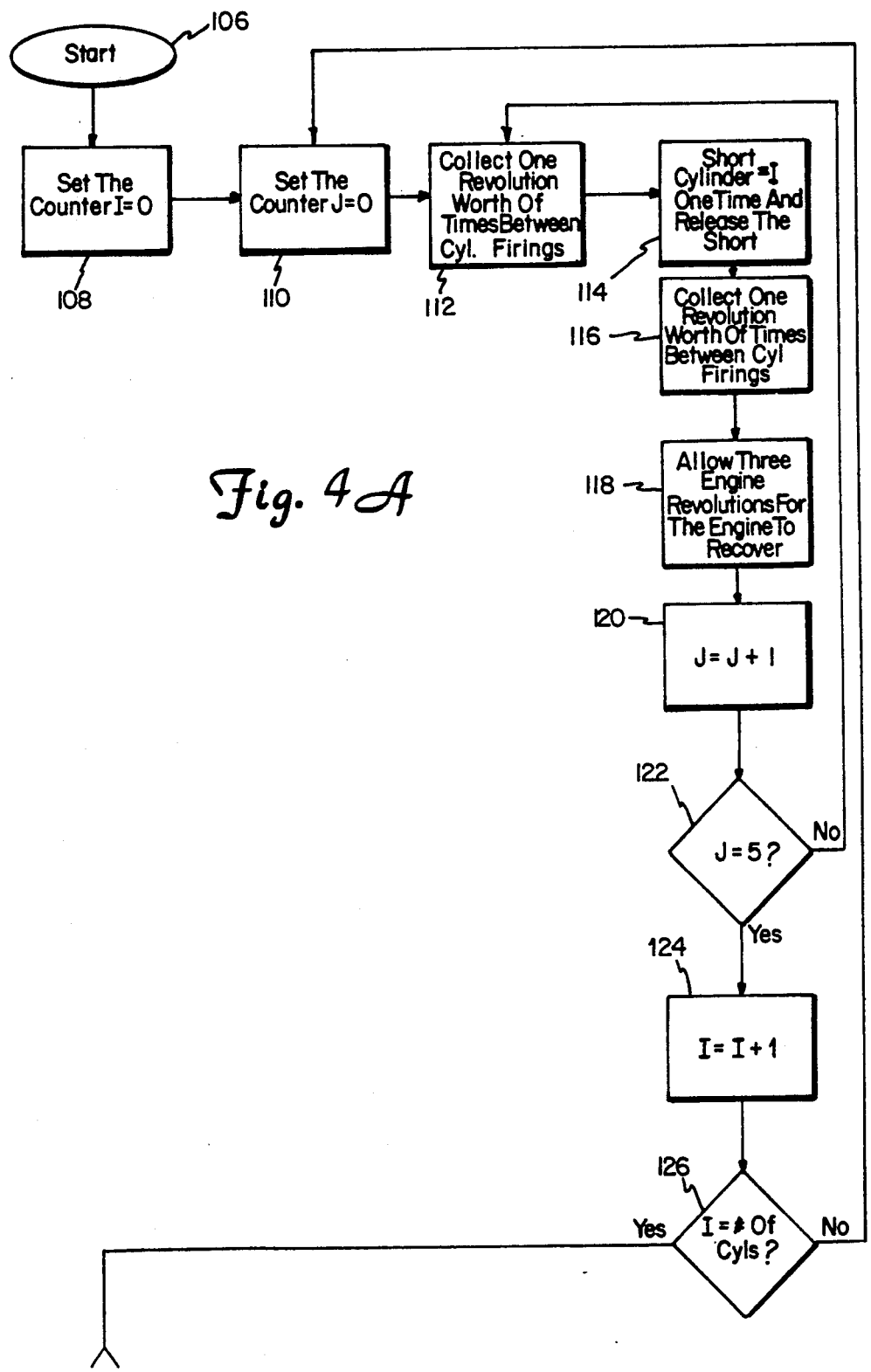
FIG. 4A and 4B are a block diagram of a fast power check.
Figure 4B:
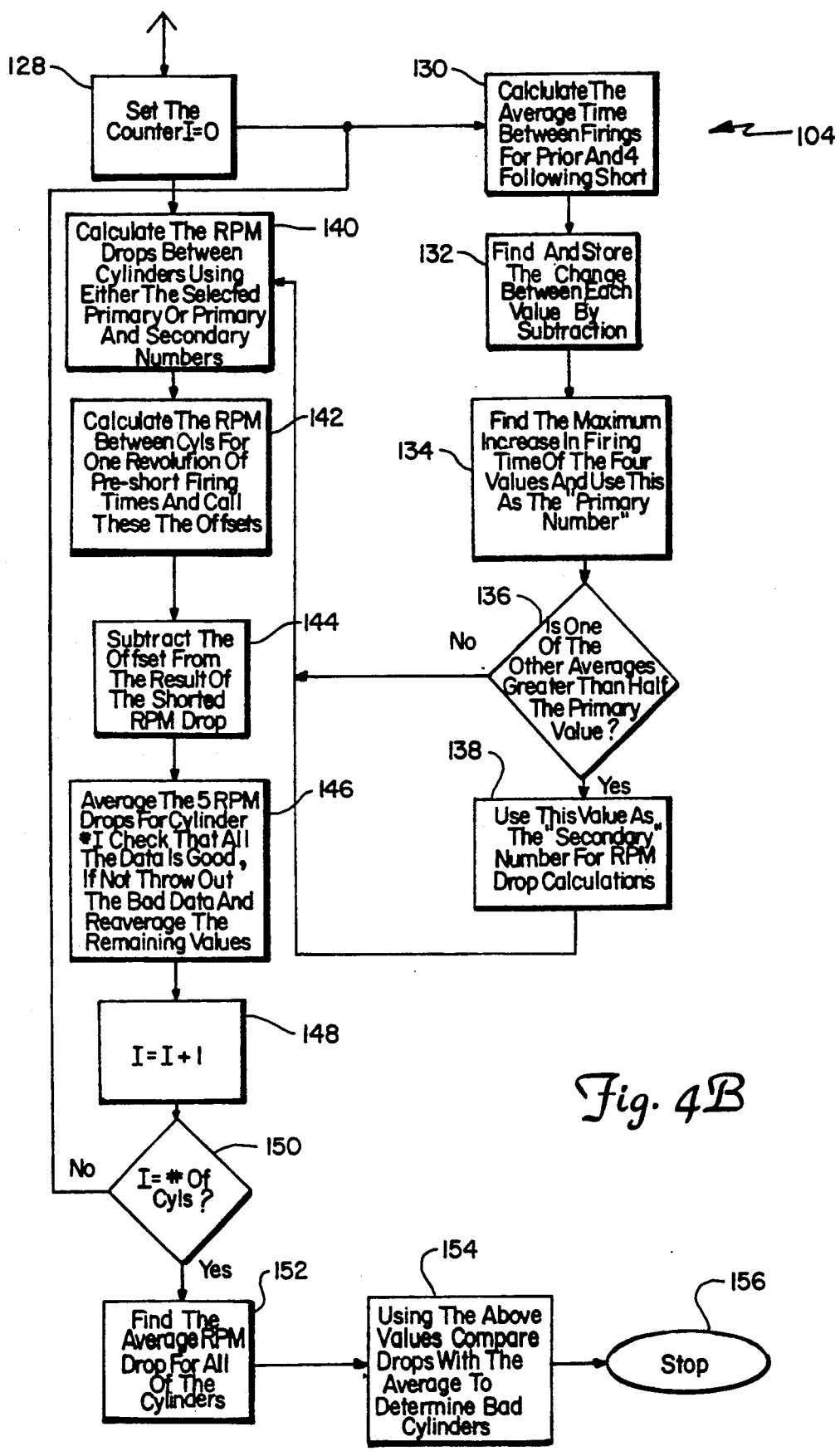

FIGS. 4A and 4B show a block diagram 104 of fast power check or cylinder efficiency check. Block diagram 104 is executed by CPU and timer section 86. The fast power check is initialized at start block 106. Control is passed to block 108 where a counter I is set equal to zero. At block 110 a counter J is set equal to zero. From block 110, control is passed to block 112 where the firing time between cylinders is collected for one revolution of the engine under test. This data is indicative of instantaneous RPM of the engine. In block 114 of flow chart 104, cylinder I is momentarily electrically shorted by power check circuit 94 and control is passed to block 116. In block 116, times between the firings of cylinders are collected for one revolution of the engine and control is passed to block 118 where the engine is allowed three complete revolutions to stabilize. In block 12 , the counter J is incremented and control is passed to block 122 where counter J is compared with five. If J does not equal five, control is returned to block 112 If J is equal to five control is passed on to block 124.

In block 124 the counter I is incremented by one and control is passed to block 126. In block 126 the counter I is compared with the number of cylinders in the engine under test. If I does not equal the number of cylinders in the engine, control is returned to block 110. If I equals the number of cylinders in the engine, control is passed to block 128 where I is set equal to Zero. From block 128 block 130 is executed. In block 130, the average time between cylinder firings is calculated using the data collected just prior to shorting a cylinder at block 114 and the four cylinder firings of the engine which follow the shorting of the cylinder at block 114. From block 130, control is passed to block 132. In block 132 the greatest change between each average is calculated by subtracting the values calculated in block 130. In block 134, the maximum increase in firing time for the average is identified and used as a "primary number." At block 136, the other averages are compared with half the primary value. If one of the other averages is greater than half the primary value control is passed to block 138 where this value is identified as a "secondary" value. On the other hand, if the test in block 136 returns a false result, control is passed to block 140. At block 140, central processing unit 86 calculates the RPM drop (i.e., the drop in instantaneous RPM for a cylinder) using the primary or primary and secondary values and the instantaneous RPM for each cylinder. At block 142, offset values for each cylinder are found by calculating the RPM between cylinders measured just before shorting the cylinder at block 114. In block 144, the offset for each cylinder calculated in block 142 is subtracted from the RPM due to the short caused at block 114, and control is passed to block 146. In block 146, the average RPM drop for cylinder No. 1 is calculated. "Bad" data is discarded prior to averaging. Data is considered bad if instantaneous RPM falls outside a predetermined maximum change from preceding RPM values. In block 148, the counter I is incremented by one and control is passed to block 150. Block 150 checks to see if the counter I is equal to the number of cylinders in the engine under test. If the counter is not equal, block 150 passes control to block 130 and the steps in blocks 130 through 148 are repeated If the counter I is equal to the number of cylinders in the engine under test, block 150 passes control to block 152. At block 152, the average RPM drop for all the cylinders is calculated. At block 154 bad cylinders are identified by comparing individual RPM drops with the average RPM drop. This information can be displayed on display 14. At block 156, the fast power check procedure is terminated.

The purpose of the fast power check is to determine the amount of power each cylinder contributes to the total power of the engine. The fast power check does this without allowing time for the closed loop engine control system to compensate for the lost cylinder. The power is measured in RPM drop as each cylinder's spark is inhibited. This is done by shorting the primary side of the ignition coil with power check circuit 94 just as the spark for the cylinder is to be delivered.

During the fast power check, there are two methods of shorting the coil, "O-inhibit" (On-inhibit) which inhibits the plug from firing, and "R-inhibit" (Release-inhibit) which releases the short from the coil Two timers are used to measure the firing times derived from the primary clock. These two timers are put into the period measurement mode with each timer measuring alternate firing times. The external clock to these timers is prescaled by six, so one count equals six microseconds. These counts are stored in memory. Eventually, they are converted into RPM and stored in the memory 87 of CPU 86. The format for shorting the cylinders is as follows:

| REVO-LUTION A | REVO-LUTION B | REVO-LUTION C | REVO-LUTION D | REVO-LUTION E |
| --- | --- | --- | --- | --- |
| GRAB DATA SHORT CYLINDER | GRAB DATA | WAIT | WAIT | WAIT |

This procedure is executed five times for every cylinder, starting with cylinder No. 1. Therefore, it takes 25 revolutions to power check one cylinder.

After all the cylinder shortings have been completed, a series of computations are made. First, the engine speed in RPM is calculated from the firing times. Every count stored in memory 87 gets converted into RPM and stored in memory 87.

When a short is applied to a cylinder, it can have an effect on either the first, second, third, or fourth firing time immediately following the short or any combination of the four. CPU 86 determines which of the firing time(s) after the short are affected the most. CPU 86 calculates the average firing time for the following:

A) Prior to Short
B) First following Short
C) Second following Short
D) Third following Short
E) Fourth following Short These five firing time averages are derived from all of the cylinder shortings. These five values are stored in memory and used to find the firing time that is affected the most, where A, B, C, D, and E are from above:
1) A-B   2) B-C   3) C-D   4) D-E The four results are stored in memory and the maximum of the four values is identified. The number, (1, 2, 3, or 4) that is associated with this maximum value is considered the primary number. Since the short could effect a combination of 1, 2, 3, and 4, another calculation must be done. If one of the other numbers is greater than half the primary value, it is considered a secondary number. If there is a secondary number, RPM drops will be calculated with two subtractions instead of one substraction with only a primary number. An example is shown below:

EXAMPLE 1

Primary Only (A-B) is the Primary, no Secondary
Result: $(RPM_A - RPM_B)$

EXAMPLE 2

Primary with Secondary (A-B) is the Primary
(B-C) is the Secondary
Result: $(RPM_A - RPM_B) + (RPM_B - RPM_C) = RPM_A - RPM_C$ The secondary number can be before or after the primary number. An example with the secondary before the primary is shown below:

EXAMPLE 3

(C-D) is the Primary
(B-C) is the Secondary

CPU 86 calculates the difference between firing times during the first revolutions of the test, i.e., without the short. These results are called the offsets and there are as many offsets as there are cylinders in the engine. The next calculation finds the actual RPM drop after each shorting pulse. When calculating these figures, the RPM associated with the firing time is actually used, not the firing time itself. The RPM drops calculated above are stored in memory.

The system discards bad data. The first criteria for throwing out data is to make sure the average RPM drop is greater than five RPM. If not greater than five RPM, then the straight average stays in the memory. If the average RPM is greater than 5 RPM, then the five values that were used to calculate the average RPM drop are put through a deviation routine. The routine will throw out any values that are less than half or greater than twice the average RPM drop. A new average will be taken if any are eliminated. The straight average will be used if all the values are thrown out.

CPU 86 calculates the average RPM drop for all cylinders and finds the largest RPM drop of the cylinders, divides it by 3, and stores it in memory. CPU 86 then calculates the average RPM drop for all cylinders but throws any values out that are less than one third of the largest RPM drop.

Data collected during the fast power check of FIGS. 4A and 4B is used to generate a cylinder map of the engine being tested. When each cylinder is disabled during the power check, a drop occurs in the RPM of the engine. However, the RPM drop occurs some time after the induced misfire and will actually appear during the firing of a succeeding cylinder. CPU and timer section 86 generates a cylinder map with the power check data which indicates where the RPM drop occurs for a misfiring of a cylinder. This map is stored in memory 87 of CPU 86.

Figure 5:
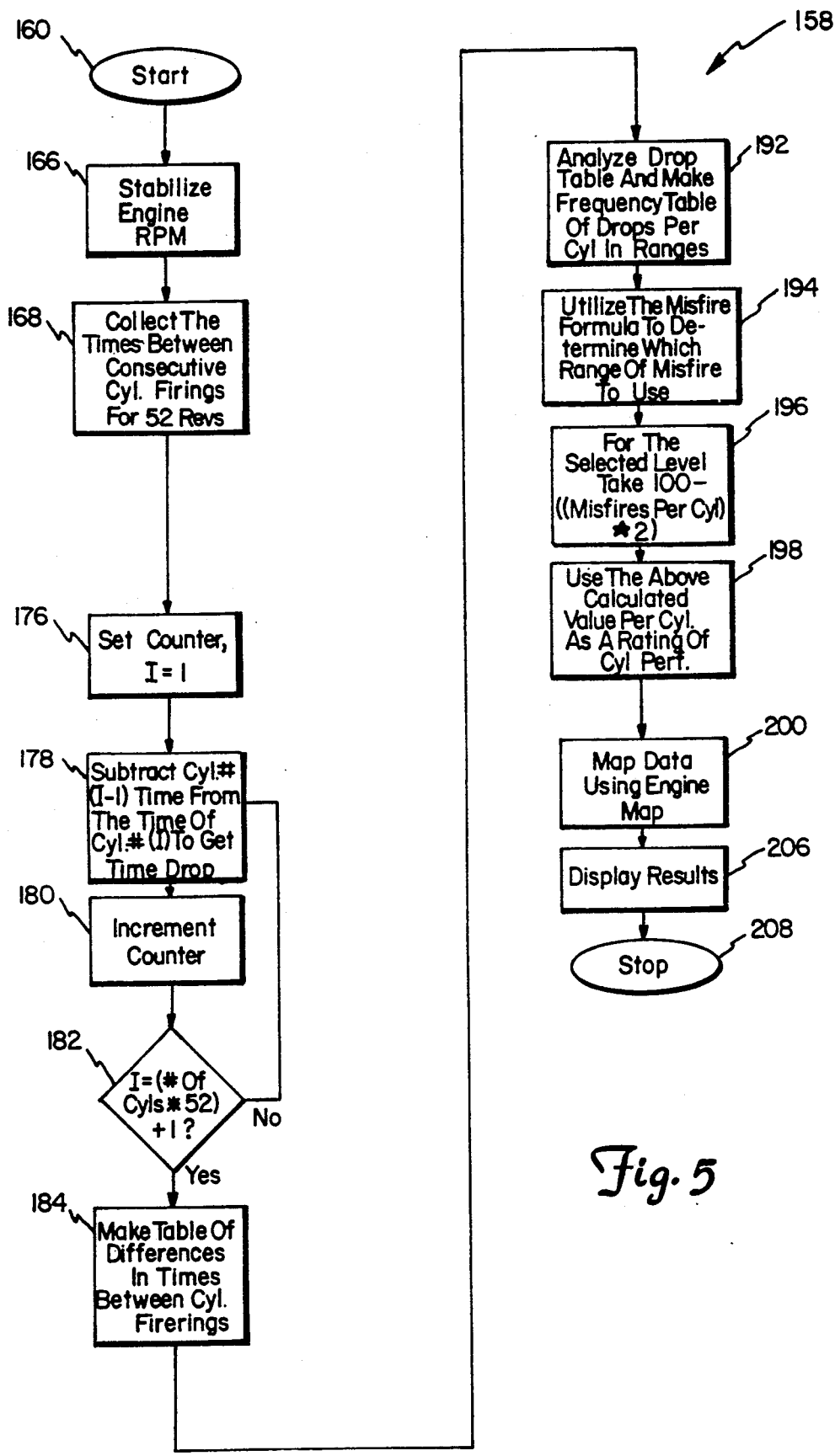
FIG. 5 is block diagram of an RPM variation test.

FIG. 5 shows a block diagram 158 of an RPM variation test. This is also called a cylinder performance test. Block diagram 158 of FIG. 5 is performed by CPU and timing section 86. The RPM variation test is initiated at start block 160. Block 166 instructs the user to stabilize the engine at a predetermined RPM value. Block 166 passes control to block 168 which collects the times between consecutive cylinder firings for a total of 52 engine revolutions. Block 168 passes control to block 176, and a counter 1 is set equal to one. At block 178, the firing time for cylinder I minus one is subtracted from the firing time of cylinder I to calculate a drop in the time between cylinders. At block 180, the counter I is incremented by one. In block 182, the counter I is compared with a value equal to the number of cylinders in the engine times 52, plus one. If the test of block 182 is false, control is returned to block 178. If the test is true, control is passed to block 184. At block 184, a table is created which contains the differences of firing times between the cylinders of the engine. Block 184 passes control to block 192. Block 192 creates a frequency table which shows the time drop per cylinder in ranges. At block 194, a misfire formula is used to determine which level indicates a misfire. At block 196, a cylinder performance rating is calculated using the formula 100−((misfires per cylinder)×2). At block 198 the cylinder timing data is used to create a cylinder performance rating. Block 200 maps the test results using the engine map stored in memory 87 of CPU 86. Block 200 passes control to block 206 which graphically displays the results on display 14. At block 208 the RPM variation test is terminated.

FIG. 6 shows a block diagram 210 for generating an RPM variation test including a mapping step in accordance with the present invention. Block diagram 210 is initiated at block 212. At block 213, a non-invasive or relative compression test is performed on the engine. The relative compression test is performed by cranking the starter motor and measuring voltage drop due to starter load. Large voltage drops in the electrical system indicate high compression while small voltage drops indicate low compression in a cylinder. Thus, small voltage drops indicate poor compression. This data is stored in CPU and timer section 86.

A fast power check is performed at block 214. At block 216, results from the power check and compression are used to generate an engine map. Data from the compression check is used to identify whether there are any mechanical failures which might alter the layout of the cylinder map. If a significant mechanical failure is detected, it is not possible to non-invasively generate a cylinder map and CPU 86 informs an operator. The power check momentarily disables each cylinder. The engine is monitored by the engine analyzer equipment. The disabled cylinder shows up as a power drop at some time later in the firing sequence. A cylinder map is generated by CPU 86 by examining data collected during the power check and stored in memory 87. For each misfire induced by power check circuit 94, the point at which the instantaneous RPM of the engine drops is identified. There may even be a number of RPM drops after the induced misfire. At block 218, an RPM variation test is performed. This is shown in detail in FIG. 5. At block 220, the map generated in block 216 and stored in memory 87 is used to map the results of the RPM variation test performed at block 218. The procedure is terminated at block 222. This allows a misfire to be traced to the actual cylinder which misfired. Therefore, with the present invention it is not necessary to store engine maps for all engine models currently in use. An engine map is generated just prior to performing a performance test. This has an additional advantage in that engines which have significantly changed from factory specifications are mapped in their current condition. Therefore, variations between engines of the same type, typically due to age, are considered when performing a performance test in accordance with the present invention.

The present invention provides an RPM variation test for use in an engine analyzer system in which engine maps have not been previously stored and fixed in a memory in the engine analyzer. Maps are generated just prior to testing the engine. This provides a more accurate engine test. Furthermore, the engine analyzer is less expensive to produce because maps for every type, model and variation of engine need not be previously stored in the engine analyzer.

Although the present invention has been described with reference to preferred embodiments, workers skilled in the art will recognize that changes may be made in form and detail without departing from the spirit and scope of the invention. For example, an engine test other than an RPM variation test can use the engine map generated by the present invention.

What is claimed is:

1. An apparatus for performing an engine performance test on an internal combustion engine, the internal combustion engine having a plurality of cylinders and an ignition system for controlling firing of the cylinders, comprising:

means coupled to the ignition system of the internal combustion engine for sensing cylinder firing pulses;

means for coupling to a primary winding of an ignition coil of the internal combustion engine;

shorting means coupled to the means for coupling to a primary winding for electrically shorting the primary winding to ground whereby a cylinder misfire is induced in the internal combustion engine;

means coupled to the means for sensing cylinder firing pulses for detecting changes in instantaneous RPM of the internal combustion engine;

means connected to the shorting means and the means for detecting changes in instantaneous RPM for correlating an induced misfire with changes in instantaneous RPM of the internal combustion engine and generating an engine map;

means for storing the engine map; and engine performance test means for measuring a function of the internal combustion engine which relates to individual cylinders of the internal combustion engine and mapping the function of the internal combustion engine to individual cylinders in the internal combustion engine using the engine map stored in the means for storing.

2. The apparatus of claim 1 wherein the means for sensing cylinder firing pulses comprises a probe for coupling to ignition system of the engine.

3. The apparatus of claim 1 wherein the means for sensing cylinder firing pulses comprises a plurality of capacitive probes adapted for coupling to ignition wires of the internal combustion engine.

4. The apparatus of claim including means, coupled to the means for correlating induced cylinder misfire, for performing a relative compression test on the internal combustion engine and identifying changes in instantaneous RPM due to mechanical compression related defects in the internal combustion engine.

5. The apparatus of claim 1 wherein the function which relates to individual cylinders comprises an RPM variation test.

6. An apparatus for mapping cylinders of an internal combustion engine, comprising:
   means for sensing firings of each cylinder and providing an output related to instantaneous engine RPM;
   means for disabling firing of a cylinder in response to an input signal;
   means coupled to the means for disabling firing of a cylinder for selectively disabling a cylinder whereby a cylinder misfire is induced;
   means for generating an engine map based upon measurements taken on the engine before and after induced cylinder misfire over a number of revolutions of the engine; and
   means for correlating induced cylinder misfire with changes in instantaneous RPM of the internal combustion engine based upon the map generated by the means for generating.

7. The apparatus of claim 6 wherein the means for sensing firings of each cylinder comprises a probe for coupling to an ignition circuit of the internal combustion engine.

8. The apparatus of claim 6 wherein the means for individually sensing firing of each cylinder comprises a plurality of capacitive probes adapted for coupling to ignition wires of the internal combustion engine.

9. The apparatus of claim 6 wherein the means for disabling firing of a cylinder comprises means for electrically shorting an ignition coil of the internal combustion engine prior to firing of a cylinder.

10. The apparatus of claim 6 including a memory coupled to the means for generating, wherein the memory stores the engine map.

11. The apparatus of claim 10 including means for performing an engine performance test on the internal combustion engine and using the engine map stored in memory to correlate performance test results to individual cylinders in the internal combustion engine.

12. The apparatus of claim 11 wherein the engine performance test comprises dan RPM variation test.

13. The apparatus of claim 6 including means, coupled to the means for correlating induced cylinder misfire, for performing a relative compression test on the internal combustion engine and identifying changes in instantaneous RPM due to mechanical compression related defects in the internal combustion engine.

14. A method for testing of an internal combustion engine, comprising:
   disabling firing of a cylinder of the internal combustion engine to induce cylinder misfire;
   monitoring instantaneous RPM of the internal combustion engine;
   correlating changes in instantaneous RPM of the internal combustion engine with induced cylinder misfires; and
   generating an engine map based upon correlation between instantaneous RPM and induced cylinder misfires.

15. The method of claim 14 wherein disabling firing of a cylinder comprises electrically shorting an ignition coil of the internal combustion engine.

16. The method of claim 14 including performing an engine performance test and mapping results from the engine performance test using the cylinder map stored in memory.

17. The method of claim 16 wherein the engine performance test comprises an RPM variation test.

18. The method of claim 14 including performing a compression test on the internal combustion engine and identifying cylinder misfires attributable to compression defects.

19. A method of testing a multi-cylinder internal combustion engine, the method comprising:
   performing a power check test on the engine by disabling a firing of a cylinder to induce a cylinder misfire;
   generating an engine map based upon results of the power check test;
   performing an RPM variation test on the engine; and
   correlating results of the RPM variation test with specific cylinders of the engine using the engine map.

20. The method of claim 19 including performing a compression check on the engine.

21. The method of claim 20 including identifying RPM variations which are due to mechanical defects in the engine which manifest in loss of compression.

22. The method of claim 19 wherein performing a power check test comprises disabling a cylinder while monitoring engine output.

23. The method of claim 22 wherein disabling a cylinder comprises electrically shorting an ignition coil of the engine.

* * * * *

UNITED STATES PATENT AND TRADEMARK OFFICE
CERTIFICATE OF CORRECTION

PATENT NO. : 5,189,907

DATED : March 2, 1993

INVENTOR(S) : JOSEPH A. MARINO, SURENDER MAKHIJA, JOHN P. SUTTON
STEVE A. TROTTIER

It is certified that error appears in the above-identified patent and that said Letters Patent is hereby corrected as shown below:

Col. 11, line 10, delete "claim", insert --claim 1--

Col. 12, line 2, delete "dan", insert --an--

Signed and Sealed this

Twenty-eighth Day of December, 1993

Attest:

BRUCE LEHMAN

*Attesting Officer*                *Commissioner of Patents and Trademarks*